(12) United States Patent
Geckeler et al.

(10) Patent No.: US 9,802,819 B2
(45) Date of Patent: Oct. 31, 2017

(54) CONDUCTING NETWORK COMPOSITE COMPRISING POLYANILINE AND POLYPYRROLE, AND METHOD FOR PREPARING THE SAME

(71) Applicant: GWANGJU INSTITUTE OF SCIENCE AND TECHNOLOGY, Gwangju (KR)

(72) Inventors: Kurt E. Geckeler, Gwangju (KR); Nour Fathi Attia, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 880 days.

(21) Appl. No.: 14/144,669

(22) Filed: Dec. 31, 2013

(65) Prior Publication Data
US 2015/0017414 A1    Jan. 15, 2015

(30) Foreign Application Priority Data
Jul. 11, 2013    (KR) .......................... 10-2013-0081482

(51) Int. Cl.
*C01B 3/00*    (2006.01)
(52) U.S. Cl.
CPC ........... *C01B 3/0078* (2013.01); *Y02E 60/324* (2013.01); *Y10T 428/249921* (2015.04)
(58) Field of Classification Search
CPC ......... C01B 3/0078; Y10T 428/249921; Y02E 60/324
See application file for complete search history.

(56) References Cited

U.S. PATENT DOCUMENTS

2011/0229706 A1* 9/2011 Epstein .................. B82Y 30/00
428/292.1

OTHER PUBLICATIONS

Exception to Loss of Novelty published at the 2013 WILEY-VCH Verlag GmbH & Co. KGaA (p. 931-937), Weinheim on Apr. 26, 2013.

* cited by examiner

*Primary Examiner* — Arti Singh-Pandey
(74) *Attorney, Agent, or Firm* — Hauptman Ham, LLP

(57) ABSTRACT

Disclosed herein are a conducting network for storing gas such as hydrogen, carbon dioxide, or the like, and a method for preparing the same, and particularly, a conducting network composite including: dopant-doped polyaniline nanofiber supporter; and a polypyrrole layer laminated on the supporter, and a method for preparing the same. According to the present invention, a novel conducting network composite suitable for being used as an energy storage material for various purposes may be provided by a simple and economical method, and since a polyaniline nanofiber having the entangled structure may function as an excellent supporter for forming a network composite material and a thickness of the polypyrrole layer may be easily adjusted, the nanocomposite for being used in various fields may be simply and economically prepared.

3 Claims, 5 Drawing Sheets

CONDUCTING NETWORK COMPOSITE COMPRISING POLYANILINE AND POLYPYRROLE, AND METHOD FOR PREPARING THE SAME

CROSS REFERENCE TO RELATED APPLICATION

This application claims priority to Korean Patent Application No. 10-2013-0081482 filed on 11 Jul. 2013, and all the benefits accruing therefrom under 35 U.S.C. §119, the contents of which is incorporated by reference in its entirety.

BACKGROUND OF THE INVENTION

1. Technical Field

The present invention relates to a conducting network composite for storing gas such as hydrogen, carbon dioxide, or the like, and a method for preparing the same.

2. Description of the Related Art

Recently, a renewable energy source such as hydrogen has been in the social spotlight. Particularly, hydrogen has higher chemical energy density (142 MJ/kg) than that of other hydrocarbon fuel. Therefore, it is known that hydrogen may play an important role in solving problems associated with energy shortage. In detail, U.S. Department of Energy determines various reference values for reversible gravimetric and volumetric values of hydrogen storage in applying hydrogen to a transportation field. For this reason, research into various materials for storing hydrogen has been conducted.

Conducting polymers having various nanostructures have properties as an organic conductor, and a low volume system, and interesting physiochemical properties and are significantly useful for various purposes. Due to development of the conducting polymer, an interest in optical, electronic, and electric properties required in various application fields has increased. Due to unique properties of the conducting polymers used in various industrial fields, researches into synthesis and characterization of nanostructures based on these conducting polymers has been actively conducted. Among the conducting polymers, research into polyaniline (PANI), polypyrrole (PPY), and polythiophene has been mainly conducted. Particularly, since polyaniline and polypyrrole have excellent thermal and electrical properties and environmental stability, various researches has focused on synthesis of a polyaniline-polypyrrole copolymer (F. Fusalba, D. Belanger, *J. Phys. Chem. B.* 1999, 103, 9044.; J. Stejskal, M. Trchova I. A. Ananieva, J. Janca, J. Prokes, S. Fedorova, I. Sapurina, *Synth. Met.,* 2004, 146, 29.; P. Xu, X. Han, C. Wang, B. Zhang, X. Wang, H. L. Wang, *Macromol. Rapid Commun.* 2008, 29, 1392).

A conducting PANI-PPY composite has a combination of excellent properties as compared to properties of each of the polymers themselves. The reason is that the conducting PANI-PPY composite has unique conducting nanostructure nanofiber morphology. Particularly, a one-dimensional structure of polyaniline nanofiber has an advantage in that the one-dimensional structure of polyaniline nanofiber may be easily produced while adjusting a diameter thereof. In addition, polyaniline has excellent oxidation-reduction properties for reducing predetermined metal ions, and a PANI-metal nanoparticles composite applicable to various application fields may be prepared due to these properties (J. Huang, R. B. Kaner, *Angew. Chem. Int. Ed.* 2004, 43, 5817.; D. Li, R. B. Kaner, *J. Am. Chem. Soc.* 2006, 128, 968.; N. R. Chiou, A. J. Epstein, *Adv. Mater.* 2005, 17, 1679).

In the related art, research into a technology for using a conducting polymer as hydrogen storage material has been reported. In this research, it was reported that commercial PANI and PPY may store at most 8 weight % of $H_2$ (S. J. Cho, K. S. Song, J. W. Kim, T. H. Kim, K. Choo, *Fuel chem. Div. Prepr.* 2002, 47, 790). Although other researchers did not succeed in reproducing the result as described above (B. Panella, L. Kossykh, U. Dettlaff-Weglikowsa, M. Hirscher, G. Zerbi, S. Roth, *Synth. Met.* 2005, 151, 208), the conducting polymer and a nanocomposite thereof has been spotlighted as an attractive material for storing hydrogen (S. J. Cho, K. Choo, D. P. Kim, J. W. Kim, Catal. Today 2007, 120, 336.; J. Germain, J. M. J. Frechet, F. Svec, *J. Mater. Chem.* 2007, 17, 4989.; M. U. Jurczyk, A. Kumar, S. S. Srinivasan, E. K. Stefanakos, Int. *J. Hydrogen Energy* 2007, 32, 1010.; N. B. McKeown, P. M. Budd, D. Book, *Macromol. Rapid Commun.* 2007, 28, 995.; S. S. Srinivasan, R. Ratnadurai, M. U. Niemann, A. R. Phani, D. Y. Goswami, E. K. Stefanakos, *Int. J. Hydrogen Energy* 2010, 35, 225.; D. E. Demirocak, S. Kuravi, M. K. Ram, C. K. Jotshi, S. Srinivasan, A. Kumar, Y. Goswami, E. Stefanakos, *Adv. Mater. Research* 2012, 445, 571).

However, since the morphology, chemical formula, and composition of a composite material have a significant influence on a hydrogen storage property, it is not easy to prepare a composite material having excellent physical and chemical properties.

SUMMARY OF THE INVENTION

The present invention has been made in an effort to provide a novel conducting network composite based on polyaniline-polypyrrole that is suitable for being used as an energy storage material for various purposes, and a method for preparing the same.

According to an exemplary embodiment of the present invention, there is provided a conducting network composite including: a dopant-doped polyaniline nanofiber supporter; and a polypyrrole layer laminated on the supporter.

The dopant may be hydrochloric acid (HCl), camphorsulfonic acid (HCSA), nitric acid ($HNO_3$), perchloric acid ($HClO_4$) or a mixture thereof.

The conducting network composite may further include metal nanoparticles laminated between the polyaniline nanofiber supporter and the polypyrrole layer.

The metal may be selected from a group consisting of palladium (Pd), platinum (Pt), titanium (Ti), or an alloy thereof.

According to another exemplary embodiment of the present invention, there is provided a method for preparing a conducting network composite containing polyaniline and polypyrrole, the method including: preparing a dopant-doped polyaniline nanofiber supporter; immersing the dopant-doped polyaniline nanofiber supporter in an oxidant solution and drying the immersed supporter; and forming a solid phase polypyrrole layer on the dopant-doped polyaniline nanofiber supporter by exposing the dried dopant-doped polyaniline nanofiber supporter to a vapor phase pyrrole monomer to perform a polymerization reaction of the pyrrole monomer.

The dopant may be hydrochloric acid (HCl), camphorsulfonic acid (HCSA), nitric acid ($HNO_3$), perchloric acid ($HClO_4$) or a mixture thereof.

The oxidant solution may be a $FeCl_3$ solution in methanol.

The oxidant solution may have a concentration of 5 to 20 weight %.

The exposure to the vapor phase pyrrole monomer may be performed by putting a liquid phase pyrrole monomer solution in a sealed container and evaporating the solution.

The method may further include, after the preparing of the polyaniline nanofiber supporter, laminating metal nanoparticles on the polyaniline nanofiber supporter.

The metal may be selected from a group consisting of palladium (Pd), platinum (Pt), titanium (Ti), or an alloy thereof.

The method may further include, after the forming of the polypyrrole layer, washing the conducting network composite with deionized water and methylalcohol.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the present invention will be described in detail with reference to the accompanying drawings and Examples.

In the present invention, a polyaniline-polypyrrole (PANI-PPY) composite was synthesized by a simple method, and a polypyrrole layer was synthesized by a vapor phase growth method using a conducting network in which polyaniline nanofibers are entangled as a supporter. Further, a composite having a sandwich structure may be synthesized by doping the polyaniline nanofiber with uniformly dispersed palladium nanoparticles and using the doped material in synthesizing the polypyrrole layer. A hydrogen storage property of the nanocomposite, which is a resultant material, was evaluated at room temperature, and as a result, it may be appreciated that the introduced polypyrrole layer served as a new adsorption site for binding hydrogen molecules, such that hydrogen storage capacity of the composite material was improved.

In detail, the conducting network composite according to the present invention includes a dopant-doped polyaniline nanofiber supporter; and a polypyrrole layer laminated on the supporter.

The dopant may be hydrochloric acid (HCl), camphorsulfonic acid (HCSA), nitric acid ($HNO_3$), perchloric acid ($HClO_4$) or a mixture thereof. In the following Examples, as described below, the conducting network composite according to the present invention has significantly excellent hydrogen storage capacity as compared to the case of using a polyaniline nanofiber supporter that is not-doped with a dopant. In addition, the hydrogen storage capacity is affected by a kind of selected dopant and a doping thickness.

Meanwhile, the conducting network composite according to the present invention may have a double-layer lamination structure of a polyaniline layer and the polypyrrole layer, but may be formed as a composite having a triple-layer sandwich structure by including a lamination structure of metal nanoparticles therebetween. The lamination structure of the metal nanoparticle laminated between the polyaniline layer and the polypyrrole layer may be made of various metal nanoparticles in order to improve the hydrogen storage capacity and conductivity and satisfy other properties required in the composite. For example, nanoparticles of a metal selected from a group consisting of palladium (Pd), platinum (Pt), titanium (Ti), and an alloy thereof may be laminated.

The present invention provides a method for preparing a conducting network composite containing polyaniline and polypyrrole. The method according to the present invention includes: preparing a dopant-doped polyaniline nanofiber supporter; immersing the dopant-doped polyaniline nanofiber supporter in an oxidant solution and drying the immersed supporter; and forming a solid phase polypyrrole layer on the dopant-doped polyaniline nanofiber supporter by exposing the dried dopant-doped polyaniline nanofiber supporter to a vapor phase pyrrole monomer to perform a polymerization reaction of the pyrrole monomer.

As described above, the dopant may be hydrochloric acid (HCl), camphorsulfonic acid (HCSA), nitric acid ($HNO_3$), perchloric acid ($HClO_4$) or a mixture thereof. The dopant-doped polyaniline nanofiber may be synthesized by a general method known in the art. For example, the dopant-doped polyaniline nanofiber may be prepared with reference to the related art documents (D. Li, R. B. Kaner, *J. Am. Chem. Soc.* 2006, 128, 968, M. U. Jurczyk, S. S. Srinivasan, A. R. Phani, A. Kumar, D. Y. Goswami, E. K. Stefanakos, *J. Nanosci. Nanotechnol.* 2009, 9, 4561, and the like).

As the subsequent step after preparing the dopant-doped polyaniline nanofiber supporter, the immersing of the supporter in the oxidant solution and drying the immersed supporter is performed. In this case, as known from results of the Examples to be described below, the hydrogen storage capacity is significantly affected by a kind and a concentration of the used oxidant. As the oxidant solution, for example, $FeCl_3$ solution in methanol may be used, and in the case in which a content of the oxidant solution as described above is 5 to 20 weight %, a conducting network composite having excellent hydrogen storage capacity may be prepared.

After preparing the dopant-doped polyaniline nanofiber supporter, the supporter is exposed to the vapor phase pyrrole monomer, such that a vapor phase polymerization reaction of the pyrrole monomer is performed on the polyaniline nanofiber supporter. The vapor phase polymerization reaction of the pyrrole monomer may be performed by separately putting a pyrrole monomer solution and the dopant-doped polyaniline nanofiber supporter in a sealed container and naturally evaporating the pyrrole monomer solution at ambient temperature and pressure. The evaporated pyrrole monomer is changed into polypyrrole on the polyaniline nanofiber supporter through the polymerization reaction.

In addition, as described above, the method according to the present invention may further include, between the preparing of the polyaniline nanofiber supporter and the forming of the polypyrrole layer, laminating metal nanoparticles on the polyaniline nanofiber supporter. After preparing the conducting network composite having a double-layer lamination structure of polyaniline-polypyrrole or a triple-layer sandwich structure composed of polyaniline-metal nanoparticle-polypyrrole layer, finally, the washing using deionized water and methylalcohol may be further performed.

Hereinafter, Examples of the present invention will be described in detail, but the following Examples are to help the specific understanding of the present invention. Therefore, the scope of the present invention is not limited to the Examples.

Example 1 Preparation of HCl-Doped Polyaniline Nanofiber-Polypyrrole Composite The HCl-doped polyaniline nanofiber was synthesized according to the method reported in the art (D. Li, R. B. Kaner, *J. Am. Chem. Soc.* 2006, 128, 968), and as another method, for example, a modified method of the method reported in the art was used (M. U. Jurczyk, S. S. Srinivasan, A. R. Phani, A. Kumar, D. Y. Goswami, E. K. Stefanakos, *J. Nanosci. Nanotechnol.* 2009, 9, 4561).

400 mg of the synthesized polyaniline nanofiber powder was immersed in 5 weight %, 10 weight %, and 20 weight % of a $FeCl_3$ oxidant solution and dried by air, followed by exposure to pyrrole vapor at ambient temperature and pressure. A product obtained by exposure to the pyrrole vapor was washed with deionized water and methanol and then dried at 50° C. for 24 hours under vacuum.

Example 2 Preparation of HCSA-Doped Polyaniline Nanofiber-Polypyrrole Composite A polyaniline nanofiber-polypyrrole composite was prepared by the same method as in Example 1 except for using HCSA as the dopant of polyaniline.

Comparative Example 1 Preparation of Dedoped Polyaniline Nanofiber-Polypyrrole Composite A polyaniline nanofiber-polypyrrole composite in a deposed form was prepared by the same method as in Example 1 or 2 except for immersing the synthesized polyaniline nanofiber power in an aqueous $NH_4OH$ solution.

Example 3 Preparation of HCl-Doped Polyaniline Nanofiber-Palladium Nanoparticle-Polypyrrole Composite After preparing the HCl-doped polyaniline nanofiber using the method described in Example 1, 330 mg of the prepared nanofiber was re-dispersed in deionized water, and 14.45 mg of a palladium salt was added thereto. After stirring the resultant solution and filtering products, the product was washed with deionized water and methanol and dried at 50° C. for 24 hours under vacuum, thereby preparing polyaniline nanofiber-palladium nanoparticles.

Next, 350 mg of polyaniline nanofiber-palladium nanoparticle powder was immersed in 5 weight %, 10 weight %, and 20 weight % of a $FeCl_3$ oxidant solution in methanol and dried by air. Subsequently, the product was exposed to pyrrole vapor at an ambient temperature. The resultant product was washed with deionized water and methanol and then dried at 50° C. for 24 hours under vacuum.

Example 4 Preparation of HCSA-Doped Polyaniline Nanofiber-Palladium Nanoparticle-Polypyrrole Composite A polyaniline nanofiber-palladium nanoparticle-polypyrrole composite was prepared by the same method as in Example 3 except for using HCSA as the dopant of polyaniline.

Comparative Example 2 Preparation of Dedoped Polyaniline Nanofiber-Palladium Nanoparticle-Polypyrrole Composite A polyaniline nanofiber-palladium nanoparticle-polypyrrole composite in a deposed form was prepared by the same method as in Example 3 or 4 except for immersing the synthesized polyaniline nanofiber power in an aqueous $NH_4OH$ solution.

Comparative Example 3 Preparation of HCl-Doped Polyaniline Nanofiber-Palladium Nanoparticle Composite An HCl-doped polyaniline nanofiber-palladium nanoparticle composite was prepared by the same method as in Example 3 except for omitting a polypyrrole deposition process.

Evaluation Example

A chemical composition and an electronic structure of a composite material have an important influence on properties of the material. In the present invention, the polyaniline-polypyrrole composite was prepared by a simple method using the polyaniline nanofiber as the supporter. The polyaniline nanofiber itself was prepared by two methods. In detail, HCl-doped polyaniline nanofiber having a diameter of about 50 nm and a length in micrometer range was prepared according to the method reported in the art, and properties thereof were observed using a microscope.

Figure 1A:
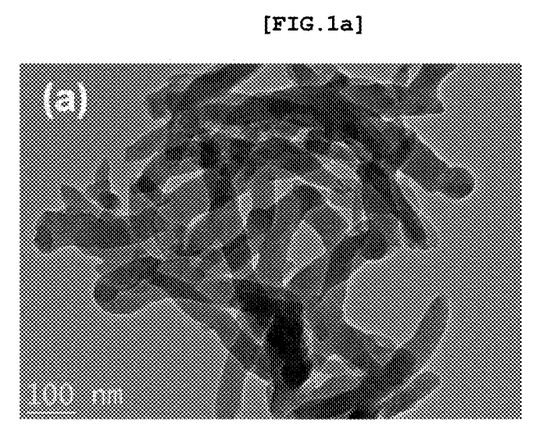
FIG. 1A is a transmission electron microscope (TEM) photograph of HCl-doped polyaniline nanofiber and FIGS. 1B to 1F are scanning electron microscope (SEM) photographs of the HCl-doped polyaniline nanofiber (B), dedoped polyaniline nanofiber (C), HCl-doped polyaniline nanofiber-PPY5 (D), HCl-doped polyaniline nanofiber-PPY10 (E), and HCl-doped polyaniline nanofiber-PPY20 (F)
Figure 1B:
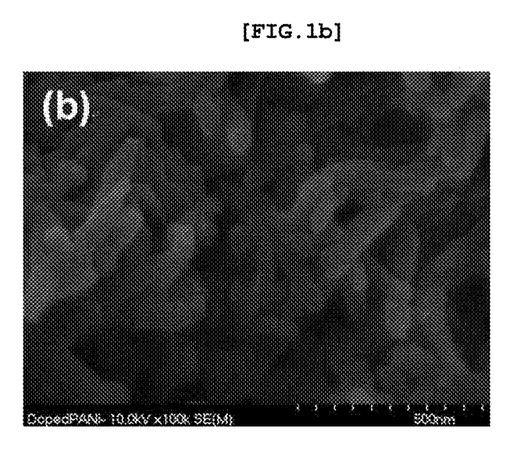
Figure 1C:
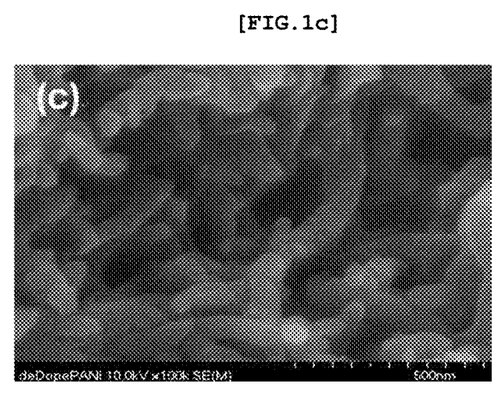
Figure 2:
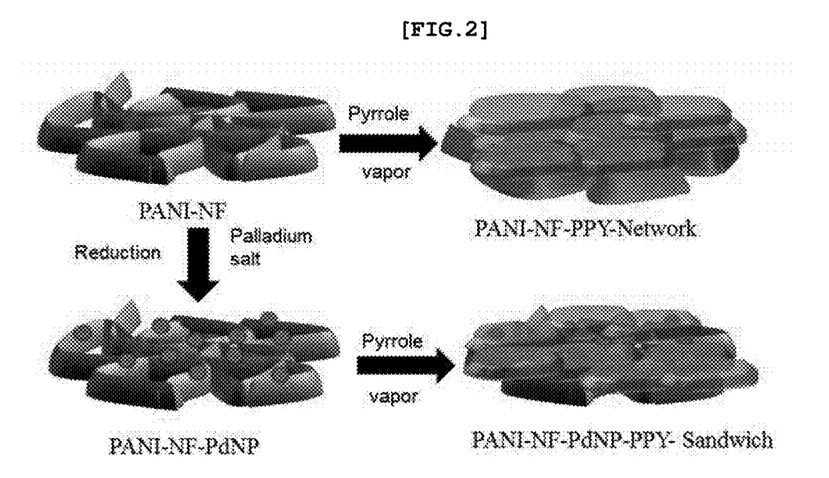
FIG. 2 is a view schematically showing a process of preparing a conducting network composite of polyaniline-PPY and polyaniline nanofiber-Pd nanoparticle-polypyrrole having a sandwich structure.

As shown in FIGS. 1A and 1C, the dedoped polymer obtained using an alkali solution had the same size and morphology as those of the doped polymer. Referring to FIG. 2, a polypyrrole conducting polymer is formed in a conducting network form on a surface of the entangled polyaniline nanofiber. A thickness of the polymerized polypyrrole layer may be adjusted by adjusting the concentration of the oxidant solution and a reaction time.

Figure 1D:
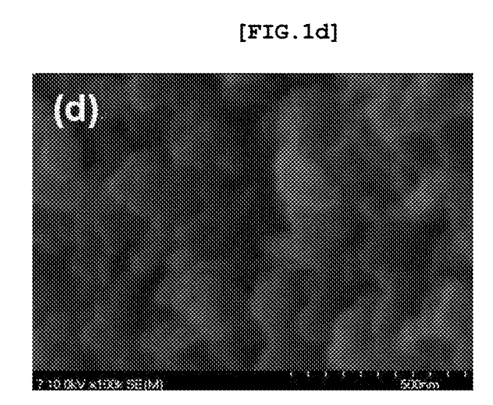
Figure 1E:
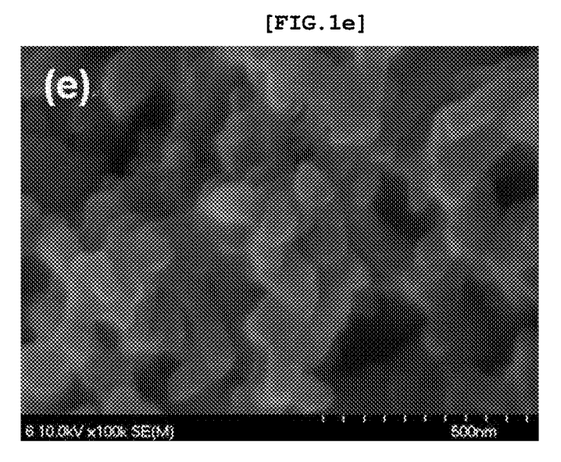
Figure 1F:
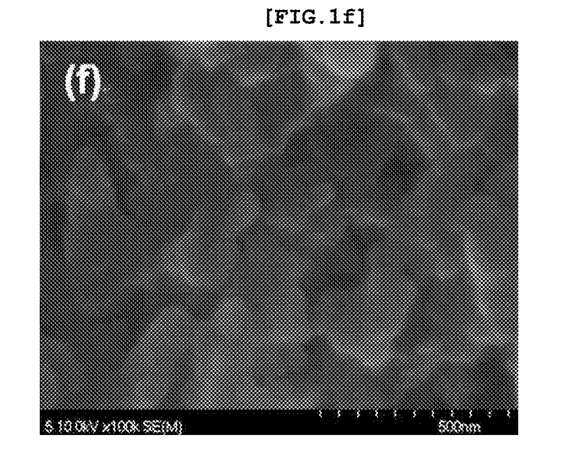

FIGS. 1D to 1F show morphologies of the HCl-doped polyaniline nanofiber and the composite thereof prepared using 5 weight %, 10 weight %, and 20 weight % of the oxidant solution, respectively, and the materials are referred to as HCl-doped polyaniline nanofiber-PPY5 (1D), HCl-doped polyaniline nanofiber-PPY10 (1E), and HCl-doped polyaniline nanofiber-PPY20 (1F), respectively. As shown in FIGS. 1D to 1F, the polypyrrole layer covered the entangled polyaniline nanofiber to form a network structure, but a shape thereof was significantly different according to the concentration of the oxidant. In addition, as known from FIGS. 1D to 1F, the network structure was formed while increasing the thickness of polypyrrole layer of the HCl-doped polyaniline nanofiber-PPY20 until the entire nanofiber structure was covered. A plurality of adsorption sites for storing hydrogen molecules as described below are formed according to this scheme. It should be focused that as the reaction time increased, a highly dense polypyrrole film completely covering the polyaniline nanofiber support was formed.

Meanwhile, the dedoped polyaniline nanofiber was re-doped with HCSA, thereby preparing HCSA-doped polyaniline nanofiber. A HCSA-doped polyaniline nanofiber-PPY 20 composite was also prepared using the oxidant having the same concentrations for the same reaction time, and morphologies of the HCSA-doped polyaniline nanofiber and the HCSA-doped polyaniline nanofiber-PPY 20 composite prepared therefrom were observed. As a result, it may be appreciated that in the case of the latter, the polypyrrole layer completely covered the polyaniline nanofiber supporter.

Figure 3:
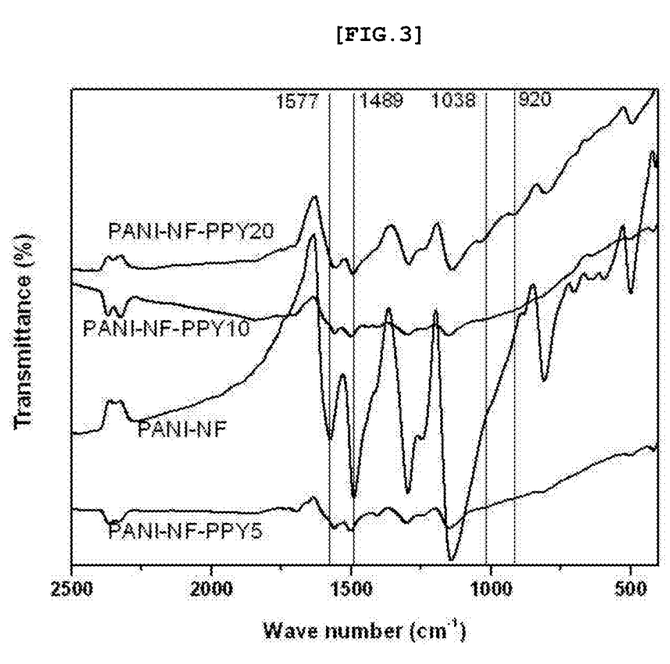
FIG. 3 is Fourier transform infrared (FTIR) spectra of HCl-doped polyaniline nanofiber, polyaniline nanofiber-PPY5, polyaniline nanofiber-PPY10, and polyaniline nanofiber-PPY20 composites.

FIG. 3 shows Fourier transform infrared (FTIR) spectra of HCl-doped polyaniline nanofibers and composites thereof prepared using the oxidant having different concentrations. In FIG. 3, a spectrum of the HCl-doped polyaniline nanofiber had strong absorption bands at 810 $cm^{-1}$ and 1139 $cm^{-1}$, and these bands are due to aromatic C—H out-of-plane and in-plane banding vibration of para-1,4-disubstituted aromatic ring. It may be confirmed from this result that the polyaniline nanofiber had a linear structure. A stretching vibration band at 1239 $cm^{-1}$ corresponds to C—N stretching vibration of secondary aromatic amine, a vibration band at 1577 $cm^{-1}$ corresponds to C=C stretching deformation of a quinoid ring, and a vibration band at 1489 $cm^{-1}$ corresponds to stretching deformation of a benzenoid ring, and these results are the same as those reported in the art. In addition, a peak at 1241 $cm^{-1}$ corresponds to C—H stretching vibration of aromatic conjugation.

The HCl-doped polyaniline nanofiber-PPY5 composite and the HCl-doped polyaniline nanofiber-PPY10 composite had polypyrrole peaks as well as characteristic polyaniline peaks, and these peaks a vibration band at 1038 $cm^{-1}$ corresponding to C—H and N—H in-plane deformation vibration and an absorption band at 920 $cm^{-1}$ corresponding to C=C in plane bending vibration of a pyrrole ring and doped polypyrrole. In the case of the HCl-doped polyaniline nanofiber-PPY20 sample, strength of these peaks was increased as the thickness of the polypyrrole layer was increased. It was noted that in the case of the composites, a vibration band was moved from at 1139 $cm^{-1}$ corresponding to the aromatic C—H in-plane bending vibration of the para-1,4-disubstituted aromatic ring to 1150 $cm^{-1}$. It may be judged that the movement as described above is due to presence of supramolecular interactions, and an interaction between the polyaniline nanofiber and polypyrrole chains was increased by the supramolecular interactions. In addition, FIG. 3 shows that in the case of the HCl-doped polyaniline nanofiber-PPY5, C=C stretching deformation of the quinoid ring was decreased at 1561 $cm^{-1}$, and in the cases of the HCl-doped polyaniline nanofiber-PPY10 and the HCl-doped polyaniline nanofiber-PPY20, C=C stretching deformation of the quinoid ring was decreased at 1551 $cm^{-1}$.

In order to prepare polyaniline nanofiber (s)-PPY20 composite, which is another conducting composite network, synthesis was performed in the presence of magnetic stirring and a surfactant. Here, (s) means a magnetic stirring method. Morphologies of the pure polyaniline nanofiber (s) and the polyaniline nanofiber (s)-PPY20, which is a composite of the pure polyaniline nanofiber (s), were observed, and as a result, it was confirmed that in the latter, the entangled structure of polyaniline nanofiber (s) was almost covered by the polypyrrole layer.

The palladium nanoparticle was synthesized on the surface of the polyaniline nanofiber using redox capacity of polyaniline. It may be appreciated from a TEM image of the polyaniline nanofiber-palladium nanoparticle that palladium nanoparticles having an average size of 4 to 5 nm were suitably dispersed in polyaniline. A triple layer nanocomposite material having a polyaniline nanofiber-palladium nanoparticle-PPY20 sandwich structure as shown in FIG. 2 was prepared by forming a polypyrrole thin layer on the polyaniline nanofiber-palladium nanoparticle composite.

Hydrogen storage capacities of the doped polyaniline nanofiber and the doped polyaniline nanofiber-PPY composite prepared using other dopants were observed at room temperature. As a result, the HCl-doped polyaniline nanofiber (Examples 1 and 3) may reversibly store 0.46 weight % of hydrogen, which is due to chemical and physical adsorption sites existing on the surface of the polyaniline nanofiber. On the contrary, in the HCSA-doped polyaniline nanofiber (Examples 2 and 4) prepared by the same preparing method, 0.4 weight % of hydrogen was reversibly stored.

The reason for a decrease in the hydrogen storage capability may be an effect of characteristics of dopant affecting a hydrogen storage process or a size of a dopant anion, and a description thereof will be provided below. On the other hand, the hydrogen storage capacity of the HCl-doped polyaniline nanofiber-PPY2-2h composite was reversible 0.91 weight %, which was almost double. The reason is that the polypyrrole thin layer was formed on the entangled structure of the HCl-doped polyaniline nanofiber supporter providing a network structure.

Two conducting polymer chains as described above form a plurality of adsorption active sites having hydrogen storage capacity. On the contrary, in the dedoped polyaniline nanofiber-PPY20-24 h composite (Comparative Example 1), only 0.28 weight % of hydrogen was adsorbed, and this value was smaller than that of the doped polyaniline nanofiber. These results mean that the dopant in addition to the adsorption sites formed in the polyaniline nanofiber-PPY20-24 h by the polymerization of the polypyrrole layer plays an important role in a hydrogen adsorption process. Under the condition as described above, hydrogen interacts with electrostatic amine groups of the doped polyaniline and is separated into hydrogen gas to form a new N—H bond with amine of the polyaniline chain. After this process, electron charge transport is generated between amine nitrogens adjacent to each other, and accordingly an unstable neutral ammonium decomposed into polyaniline in a polaronic doped state is formed. Release of hydrogen may allow this process to be reversible. Since the dopant is not present in the dedoped state, the mechanism may be supported with respect to an emeraldine salt of polyaniline. In an emeraldine salt state, amine and imine nitrogens alternately form an insulating form of polyaniline, and this form prevents electron charge transport from being generated between nitrogen sites of the polyaniline chain. As a result, any interaction is not generated between the polymer chain and hydrogen.

The HCSA-doped polyaniline nanofiber-PPY20 composite (Example 2) reversibly stored 0.52 weight % of hydrogen, which was smaller than that of the HCl-doped polyaniline nanofiber-PPY20 composite (Example 1) prepared using the same synthetic process. This difference may be due to a size of a dopant counteranion and play an important role in the hydrogen storage process. Interaction between the polypyrrole and polyaniline nanofiber chains in addition to the adsorption sites for storing hydrogen generated by polymerizing the polypyrrole thin layer on the polyaniline nanofiber causes steric hindrance in the vicinity of nitrogen sites. Therefore, the number of N—H bond formed during the hydrogen adsorption process is decreased. This steric hindrance decrease potential hydrogen adsorption capacity of a larger CSA⁻ counteranion, and for this reason, the HCSA-doped polyaniline nanofiber-PPY20 had hydrogen storage capacity (0.52 weight %) lower than that (0.91 weight %) of the HCl-doped polyaniline nanofiber-PPY20.

The result as described above was supported by the hydrogen storage capacity of the polyaniline nanofiber (s)-PPY20-2h using the polyaniline nanofiber supporter prepared in the presence of surfactant HCSA under a stirring condition. In this case, the hydrogen storage capacity was 0.73 weight %. The fact that the composite had the hydrogen storage capacity lower than that of the HCl-doped polyaniline nanofiber-PPY20 corresponds to a steric hindrance effect caused by counteranion size. Here, HCSA may function as a dopant for the polyaniline nanofiber(s) in the polyaniline nanofiber(s)-PPY20.

Further, an effect of the polyaniline nanofiber doped with small palladium nanoparticles (average particle size of 4 to 5 nm) was evaluated by observing hydrogen storage capacities of the HCl-doped polyaniline nanofiber-palladium nanoparticle (Comparative Example 3) and HCl-doped polyaniline nanofiber-palladium nanoparticle-PPY20 (Example 3). In addition, in the composite in which the palladium nanoparticles formed the sandwich structure between two conducting polymer materials, an effect of the polypyrrole layer covering the composite was also observed. As a result, hydrogen storage capacity of the HCl-doped polyaniline nanofiber-palladium nanoparticle was unexpectedly lower (reversibly 0.12 weight %) than that of the HCl-doped polyaniline nanofiber itself. On the other hand, reversible hydrogen storage capacity of the HCl-doped polyaniline nanofiber-palladium nanoparticle-PPY20-2h composite was increased to 0.47 weight %. Therefore, it may be appreciated that the adsorption sites were formed after polymerization of the polypyrrole layer. The effect was larger than that of the polyaniline nanofiber-palladium nanoparticle composite itself. As a result, it may be appreciated from the above-mentioned results that the polypyrrole thin layer increased the hydrogen storage capacity almost 4 times from 0.12 weight % to 0.47 weight %.

According to the present invention, the novel conducting network composite suitable for being used as the energy storage material for various purposes may be provided by a simple and economical method, and since the polyaniline nanofiber having the entangled structure may function as the excellent supporter for forming the network composite material and the thickness of the polypyrrole layer may be easily adjusted, the nanocomposite for being used in various fields may be simply and economically prepared.

What is claimed is:

1. A conducting network composite comprising:
 a dopant-doped polyaniline nanofiber supporter;
 a polypyrrole layer laminated on the supporter; and
 metal nanoparticles between the polyaniline nanofiber supporter and the polypyrrole layer.

2. The conducting network composite of claim 1, wherein the dopant is hydrochloric acid (HCl), camphorsulfonic acid (HCSA), nitric acid ($HNO_3$), perchloric acid ($HClO_4$) or a mixture thereof.

3. The conducting network composite of claim 1, wherein the metal is selected from a group consisting of palladium (Pd), platinum (Pt), titanium (Ti), or an alloy thereof.

* * * * *